United States Patent [19]

Folda et al.

[11] Patent Number: 4,940,740

[45] Date of Patent: Jul. 10, 1990

[54] SINGLE PHASE TOUGHENED HEAT-CURABLE RESIN SYSTEMS EXHIBITING HIGH STRENGTH AFTER IMPACT

[75] Inventors: Thomas Folda, Neuleiningen; Thomas Allspach, Bad Dürkheim, both of Fed. Rep. of Germany

[73] Assignee: BASF Aktiengesellschaft, Ludwigshafen, Fed. Rep. of Germany

[21] Appl. No.: 341,479

[22] Filed: Apr. 21, 1989

[51] Int. Cl.$^5$ .......................... C08G 59/24; C08J 5/24
[52] U.S. Cl. ..................................... 523/428; 523/468; 525/524; 528/103
[58] Field of Search ................ 523/428, 468; 525/524; 528/103

[56] References Cited

U.S. PATENT DOCUMENTS

| | | | |
|---|---|---|---|
| 3,424,707 | 1/1969 | Schaufelberger et al. | 528/103 X |
| 3,560,388 | 2/1971 | Higashi | 525/524 X |
| 3,914,504 | 10/1975 | Weldy | 525/524 X |
| 3,957,716 | 5/1976 | Weldy | 525/524 X |
| 4,120,913 | 10/1978 | Petrie | 525/524 |
| 4,645,803 | 2/1987 | Kohli et al. | 525/524 X |
| 4,728,384 | 3/1988 | Goel | 525/524 X |
| 4,734,468 | 3/1988 | Marx | 525/524 |

*Primary Examiner*—Earl Nielsen
*Attorney, Agent, or Firm*—William G. Conger

[57] ABSTRACT

Heat curable epoxy resin systems are disclosed which may be cured to form monophasic matrix resins and adhesives which, when utilized as matrix resins in carbon fiber reinforced composites, are capable of forming quasiisotropic panels having CAI values greater than 275 MPa after an impact of 6.68 kJ/m, and which maintain their tack after extended storage at room temperature.

18 Claims, No Drawings

SINGLE PHASE TOUGHENED HEAT-CURABLE RESIN SYSTEMS EXHIBITING HIGH STRENGTH AFTER IMPACT

BACKGROUND OF THE INVENTION

1. Field of the Invention

The subject invention relates to heat-curable epoxy resin systems having exceptional resistance to impact induced damage. More particularly, the subject invention relates to toughened epoxy resin systems which when cured are monophasic and which are capable of preparing carbon reinforced composites having compression after impact values greater than 40 Ksi.

2. Description of the Related Art

Epoxy resins have been widely used in the field of structural materials as matrix resins for fiber reinforced prepregs and as structural adhesives. However, it is difficult to achieve both high strength and toughness in epoxy systems, even when cured with curing agents such as the diaminodiphenylsulfones. When used as prepregging resins with carbon fibers, for example, such systems typically have compression after impact (CAI) values of only about 20–30 Ksi after an impact of 1500 in-lb/in.

In the past, high CAI values have required resort to multiphase systems. For example, in EP-A-0 252 725, epoxy resins are combined with epoxy or amine functional polyarylene ether sulfone oligomers, epoxy curing agents, and from 1 to about 16 percent of an infusible elastomer having a particle size of from 10 to about 75 μm. In addition to the discontinuous phase created by the infusible rubber particles, the cured epoxy system itself is multiphasic, having a discontinuous glassy epoxy phase dispersed in a continuous glassy polysulfone thermoplastic rich phase.

In EP-A-0 193 082 (U.S. Pat. Nos. 4,656,207 and 4,656,208) are disclosed multiphasic systems similar to those of EP-A-O 252 725 except that the infusible particles are omitted. Both of these resin systems are said to allow preparation of carbon fiber reinforced composites having CAI values of from 40–50 Ksi after having been subjected to an impact of 1500 in-lb/in.

However, the morphology of these and other multiphasic systems is cure cycle dependent and thus small variations in the cure conditions can alter the morphology of these systems in an unpredictable manner. Furthermore, the presence of appreciable amounts of acrylonitrile/butadiene or other common elastomers generally causes both a decrease in glass transition temperature and a loss in high temperature strength.

Thus, it would be highly desirable to formulate a resin system which cures to form a single phase system, but which may be used to prepare carbon composites which exhibit CAI values greater than 40 Ksi after a 1500 in-lb/in impact.

SUMMARY OF THE INVENTION

It has now been discovered that heat-curable epoxy resin systems may be formulated which exhibit but a single phase upon cure, and which are capable of preparing carbon/graphite composites having CAI values greater than 40 Ksi, and in particular greater than 43 Ksi after an impact of 1500 in-lb/in. Such resin systems are formulated with an epoxy resin component having a functionality of two or greater, an aromatic diamine curing agent, and an epoxy resin/diphenol prereact of limited molecular weight. Such resin systems also possess excellent out-time, and are suitable as matrix resins for fiber-reinforced composites and as structural adhesives.

DESCRIPTION OF THE PREFERRED EMBODIMENTS

The epoxy resins useful as the epoxy resin component in the practice of the subject invention are well known to those skilled in the art. Such epoxy resins have functionalities of two or greater, preferably two through four, and are generally prepared by the condensation of epichlorohydrin with an active hydrogen compound in the presence of base. The methods of epoxy resin synthesis as well as the physical characteristics of many epoxy resins may be found in the treatise *Handbook of Epoxy Resins,* Lee & Neville, Ed.s., McGraw-Hill, New York, ©1967.

Particularly suitable epoxy resins are the so-called DGEBF epoxy resins and the glycidyl derivatives of the dihydroxynaphthalenes; the phenol terminated dicyclopentadiene and dicyclopentadiene oligomers as taught by U.S. Pat. No. 3,536,734; the various bis[aminophenyl] substituted organic radicals such as 4,4'-diaminodiphenylmethane, 4,4- and 3,3'- diaminodiphenylsulfone, and 2,2-bis[4-aminophenyl]propane; the various aminophenols, particularly the unsubstituted 2-, 3-, and 4-aminophenols; tris[4-hydroxyphenyl]methane; 1,1,2,2-tetrakis[4-hydroxyphenyl]ethane; 9,9-bis[4-hydroxyphenyl]fluorene; and the glycidyl derivatives of amino and hydroxy functional polyarylene ether sulfones, polyarylene ether ketones, polyarylene ketone sulfones, and similar compounds having ten or fewer arylene groups in the polymer backbone, as prepared in U.S. Pat. No. 4,175,175, or by processes similar to those disclosed in EP-0 193 082 but having a glass transition temperatures lower than 150° C.

Preferred curing agents are aromatic diamines such as 2,4'-, 4,4'-, and 3,3'-diaminodiphenylmethane, 2,4'-, 4,4'- and 3,3'-diaminodiphenylsulfone, 2,2-bis[4-aminophenyl]propane, and 2,2-bis[3-aminophenyl]propane. Also suitable are the various aminophenyl terminated polyarylene ether, ether ketone, ketone sulfone and related oligomers, particularly those having a total of five or fewer arylene groups.

Epoxy resins which are useful in preparing the epoxyphenol prereacts of the present invention generally have functionalities of about 2, i.e. preferably from about 1.8 to about 2.2. Suitable epoxies have been listed previously, and additional epoxies may be found in the Lee & Neville treatise and the treatise *Epoxy Resins Chemistry and Technology,* Marcel Dekker, Inc., New York, May and Tanaka, Ed.s., ©1973.

Diphenols which are suitable include mononuclear, polynuclear non-fused, and fused aromatics having an average of two phenolic hydroxyls per molecule. Particularly well suited, for example, are the bisphenols, particularly bisphenol A, bisphenol AF, bisphenol F, bisphenol O, bisphenol S, bisphenol P, bisphenol M, bisphenol AP, 3,4'-bisphenol A, 4,4'-dihydroxybiphenyl and the substituted bisphenols, especially the methyl substituted bisphenols such as tetramethylbisphenol, tetramethylbisphenol A, bisxylenol (tetramethylbisphenol P), and the like.

Also suitable, and preferred, are the various dihydroxynaphthalenes, such as 2,7-, 2,6-, and 1,6-dihydroxynaphthalene; and the various phenolated dicyclopentadiene monomers and oligomers as taught by U.S. Pat.

No. 3,536,734. Further suitable diphenols are the phenol-terminated oligomeric polyarylene sulfone polymers as taught by U.S. patent 4,175,175 having molecular weights below 1800 Daltons, preferably below 1200 Daltons.

The preferred prereacts of the subject invention are prepared by reacting a stoichiometric excess of a substantially difunctional epoxy resin with a diphenol until all the phenolic hydroxyl groups have reacted. The reaction takes place either neat or in the presence of a suitable non-reactive solvent at a temperature of from about 100° C. to about 200° C., preferably from about 110° C. to about 160° C. and most preferably from about 135° C. to about 150° C. A catalyst which promotes the reaction of the epoxy group with phenolic hydroxyl groups is generally required, except perhaps in the case of the dihydroxynaphthalenes which have been found to react at a sufficient rate without catalysis.

Suitable catalysts for the epoxy-phenol addition reaction are well known to those skilled in the art. Strong bases such as sodium or potassium hydroxide may be used, or tertiary amines or related compounds, for example benzyldimethylamine or benzyltrimethylammonium hydroxide. However, phosphines and phosphonium salts are the catalysts of choice. Preferred catalysts of this type ar triphenylphosphine and ethyltriphenylphosphonium iodide. The amount of catalyst required depends upon the prereact monomers and the polymerization conditions, but generally, when phosphine or phosphonium catalysts are utilized, an effective amount is from about 0.001 to about 1.0 percent by weight, preferably from 0.05 to about 0.5 percent by weight.

The reaction generally takes place neat, although a solvent may be used if desired. In the case of solid reactants, these may first be melted and added to the other liquid or molten monomers, or may be added as a solid and stirred until solution is complete. The catalyst may then be added either by itself or dissolved in a suitable solvent or in additional monomer. Frequently, an exotherm will be observed following catalyst addition, therefore reactors having cooling means are desirable, and may be necessary for a given system.

The mode of addition of the various ingredients is not critical, but it has been found that variations in the order of addition may cause significant changes in the physical and chemical properties of the prereact, and this is especially so during the period of rapid viscosity change. It is especially important that the reactions are carried out to completion, as the presence of small quantities of phenols may catalyze the reaction between the epoxy group and the amino group of the curing agent. When this occurs, the out-time of the resin is undesirably short, and is a major reason why polyphenols have not been used as curing agents in conjunction with the high temperature, high performance amine curing agents such as 4,4'-diaminodiphenylsulfone. The reaction progress may be monitored by observing the decrease in the epoxy equivalent weight of the mixture, observing the change in viscosity, or the disappearance of phenolic hydroxy groups.

By the term "heat-curable resin system" is meant the final resin composition which contains all the necessary components and additives including any catalysts. The necessary components are the epoxy resin component, the prereact component, and the curing agent. Optional additives include auxiliaries such as fillers, plasticizers, pigments, rheology control agents and the like. Thermoplastic and other tougheners may also be added, and these components should preferably dissolve in the resin system either prior to or during cure to enable the formation of a monophasic system. Alternatively, particulate thermoplastics which either swell or dissolve in the resin system upon cure but which remain in particulate form during film production and/or prepregging may be added. By the term "monophasic system" is meant a system in which the cured resin forms but one continuous phase exclusive of fillers, particulate thermoplastics, pigments and reinforcing fibers, but inclusive of plasticizers and soluble organic toughening agents.

The molecular weight of the prereact component should be low enough so as to avoid phase separation upon curing of the heat-curable resin system. In general, the molecular weight of the prereact should be less than 5000 Daltons, preferably less than 2000 Daltons, and more preferably less than 1000 Daltons. However, these molecular weight limitations are system dependent, particularly with regard to the nature of the prereact components and the epoxy resin components. Thus a simple test for compatibility is the most practical manner of assessing whether a particular prereact is suitable for a particular system. This simple test consists of casting and curing a neat sample of the heat curable resin system exclusive of insolubles such as fillers, and visually observing the clarity of the casting. If the casting is turbid, then phase separation has occurred and the molecular weight of the prereact is not suitable for that particular resin system.

The heat-curable resin systems of the subject invention generally contain from 10 to about 80 percent of the epoxy resin component, from 10 to about 50 percent by weight of the prereact component, and an amount of curing agent ranging from 0.8 to about 1.6 times the stoichiometric amount calculated from the epoxy equivalent weights of the epoxy resin component and the prereact component. The resin system may also contain from 0.001 to about 5.0 weight percent of a suitable catalyst when one is required. The foregoing percentages are based on the total weights of the resin system components, that is, the epoxy resin(s), the prereact(s), the curing agent(s) and the catalyst(s). In addition to these resin system components, the final heatcurable resin system may contain up to 30 percent by weight relative to the total system weight, of auxiliary components, and up to about 30 percent by weight relative to the total system weight, of thermoplastic or other tougheners.

The resin systems of the subject invention may be used as film adhesives by casting the neat resin into thin films, either with or without a minimal support or scrim to keep the adhesive intact. Such film adhesives and the methods used to produce and utilize them are well known to those skilled in the art. The resin systems are most advantageously used to make heat-curable fiber reinforced prepregs. In this case, the matrix resin is applied to the fiber reinforcement using the single or dual film method as taught by U.S. Pat. No. 3,784,433 which is incorporated herein by reference. Such methods are well known to those skilled in the art.

The fiber reinforcement may be random, woven, or unidirectional in nature, and may be continuous fiber, so-called long fiber, or short fiber. The fiber type is preferably intermediate modulus carbon fiber such as Celion G-40-600 or Hercules IM7. Using the resin systems of the subject invention with such fibers allows preparation of composites having compression after impact (CAI) values in excess of 275 MPa (40 ksi) after an impact of 6.68 kJ/m (1500 in-lb/in), and preferably in excess of 300 MPa (43.5 ksi).

The resin systems of the subject invention may also be used with other reinforcing fibers such as silicon carbide, high or low modulus carbon, glass, quartz, boron nitride, high strength polyethylene and polypropylene, the polyamides (aliphatic or aliphatic/aromatic polyamides) the aramids (substantially all aromatic polyamides), as well as synthetic fibers, especially those having glass transition temperatures above 200° C., for example the polyetherketones, polyetheretherketones, polyetherketoneketones, and related polymers, and their sulfone analogues, the structures being prepared as taught by U.S. Pat. No. 4,175,175 and other references.

Generally, the prepregs prepared using the matrix resins of the subject invention contain between 10 and 70 weight percent matrix resin and 90 to 30 weight percent reinforcing fibers. When carbon fibers are used, the weight percent of resin lies between 20 and 60 percent, preferably between 30 and 40 percent. When other fibers are utilized, the preferable weight ranges of resin content change with the fiber density, being proportionately less with high density fibers and proportionately more with low density fibers. The volume percent, however, remains essentially the same.

It is most important, in fiber-reinforced prepreg technology as well as the film adhesive technology, that the prepreg or film be tacky and moreover, be able to maintain this tack over extended periods, particularly at room temperature conditions. Resin systems containing epoxy resins, phenols, and amine-functional curing agents cannot meet this requirement; Example 9 is illustrative of the effect of this loss of tack. Drape is also often affected as it was in Example 9, although this is not always the case. The resin systems of the subject invention are notable for their ability to retain both tack and drape over extended periods while still utilizing amine-functional curatives and while containing phenol (diphenol) residues.

The term "tack" is well known to those skilled in the art, but is generally a subjective measurement made by touching the prepreg or film surface with a finger. If the surface is "sticky" or "tacky" then it has the property of "tack". Tack may be measured subjectively by means of many scales, but to illustrate the concept, fly paper may be considered the high point of the scale with a sheet of TEFLON ® (polytetrafluoroethylene) as having no tack. By the phrase "retains a substantial part of its tack" is meant that the prepreg or film, after the respective room temperature out-time period, remains somewhat tacky or sticky. Prepregs and films having the tackiness of fly paper are not normally desirable—they are "too tacky". However, prepregs and films of intermediate tackiness which allow the layup of vertical or near vertical panels (in the case of prepregs) and the adhesive assembly of metal, plastic, or composite parts without substantial movement made possible by the adhesive film, are desirable commercial products.

The subject invention will now be illustrated by reference to the following examples, which should not be construed as limiting the scope of the invention in any way.

EXAMPLE 1

To 1000 grams of an epoxy resin having a functionality of 2.2 and an epoxy equivalent weight of approximately 230, and which may be prepared through the reaction of epichlorohydrin with phenolated dicyclopentadiene as disclosed in U.S. Pat. No. 3,536,734 (hereinafter DGEDCPD) was added 170 g of 2,7-dihydroxynaphthalene and 0.5 g triphenylphosphine. The mixture was heated slowly to 150° C. whereupon a slight exotherm temporarily caused a temperature excursion to 163° C. The mixture was stirred for one hour at 150° C., yielding a prereact with a theoretical molecular weight of 1070. To the prereact was then added 1000 g of a DGEBF epoxy resin having an epoxy equivalent weight of 165. After cooling to 90° C., 741 g of 4,4'-diaminodiphenylsulfone was added. Tg of the resulting heat-curable resin system was below 25° C. A portion of the resin was coated onto Hercules IM7 intermediate modulus carbon fiber at a nominal resin content of 33 weight percent for CAI testing. A neat sample of resin was cured for one hour at 150° C. followed by an additional two hours at 180° C. The cured resin casting was clear, indicating no phase separation during cure.

EXAMPLE 2

The resin preparation described in Example 1 was repeated but 1,6-dihydroxynaphthalene was substituted for 2,7-dihydroxynaphthalene.

EXAMPLE 3

To 500 g of DGEBF epoxy resin having an epoxy equivalent weight of 165 was added 200 g 2,7-dihydroxynaphthalene. The mixture was heated to 150° C. in the absence of a catalyst. An exotherm caused the temperature to rise to 201° C. Following completion of the reaction, an additional 1000 g of DGEBF resin was added at 200° C. After cooling to 90° C., 592 g of 4,4'-diaminodiphenylsulfone was added. The tack of this resin formulation remained nearly unchanged after 10 days storage at room temperature, and no phase separation occurred during the cure of a neat sample as indicated by the transparency of the casting.

EXAMPLE 4

To 700 g DGEDCPD epoxy was added 200 g 1,5-dihydroxynaphthalene. The mixture was heated, and 0.5 g ethyltriphenylphosphonium iodide added when the temperature reached 107° C. After the mixture reached 135° C., it was stirred for two hours at that temperature following which 488 g of a DGEBF epoxy having an epoxy equivalent weight of 165 was added. After stirring for one hour more, an additional 812 g of DGEBF epoxy was added, and the mixture cooled to 90° C. whereupon 755 g 4,4'-diaminodiphenylsulfone was added. A neat sample of this resin showed no phase separation when cured.

EXAMPLE 5 (COMPARATIVE)

Example 1 was repeated but the reaction was carried out over a three hour period at the lower temperature of 104° C. so as to avoid complete reaction. The heatcurable resin system had good tack initially, but after six days storage at reduced temperature (5° C.), it had become so brittle that it could no be used for prepregging.

EXAMPLE 6 (COMPARATIVE)

To 700 g DGEDCPD epoxy at 90° C. was added 600 g tetrabromobisphenol A and 0.5 g ethyltriphenylphosphonium iodide. The mixture was stirred at 150° C. for four hours. While the viscosity was rapidly increasing, 400 g of DGEBF epoxy having an epoxy equivalent weight of 165 was added. When the reaction was complete, as evidenced by no further change in viscosity, it was cooled to 121° C. whereupon 800 g of DGEBF epoxy which had been preheated to 120° C. was added. At 90° C., 728 g 4,4'-diaminodiphenylsulfone was added. Although the out time tack of this system was acceptable, cured plaques of neat resin were turbid,—indicating phase separation during cure into a multiphasic system.

EXAMPLE 7

An experimental resin system, believed to contain an epoxy resin, a phenol-functional curing agent, and a blocked catalyst, available from Dow Chemical Co., Midland, Mich. and designated XU71794.00, was heated to 150° C. without addition of other ingredients. While the viscosity was rapidly increasing, 200 g of a DGEBF epoxy resin having an epoxy equivalent weight of 165 was added. Stirring was continued for four hours at 150° C. following which an additional 800 g DGEBF epoxy resin was added, the mixture cooled to 90° C., and 582 g 4,4'-diaminodiphenylsulfone added. The heat-curable resin system had tack which remained almost unchanged after ten days at room temperature. A cured casting of neat resin was clear, indicating the presence of but a single phase.

EXAMPLE 8 (COMPARATIVE)

Eight hundred grams of the experimental resin XU71794.00 described in Example 7 was stirred at 150° C. for three hours, by which time the viscosity had risen so high that effective stirring was no longer possible, indicating that a high molecular weight prereact had been obtained. At this point, 185 g of DGEBF was added, the mixture cooled to 90° C., and 629 g DDS added. Castings from this resin system were turbid, indicating phase separation upon cure.

EXAMPLE 9 (COMPARATIVE)

To a sample of the experimental resin XU71794.00 described in Example 7 was added 2.0 weight percent 4,4-diaminodiphenylsulfone. No prereaction of the resin was carried out prior to diaminodiphenylsulfone addition. The resulting heat-curable resin system rapidly lost its tack, becoming so brittle within a period of one day that prepregging would be difficult or impossible.

EXAMPLE 10

To 1000 g of the DGEDCPD epoxy described in Example 1 was added 198 g of 4,4'-dihydroxybiphenyl at 165° C. The mix was cooled to 150° C. when 3 g ethyltriphenylphosphonium iodide was added slowly. The resin mix exothermed to 198° C. following which the temperature was reduced to 150° C. After mixing for 30 minutes, 1000 g of DGEBF epoxy was added, the mixture was cooled to 90° C., and 741 g of 4,4'-diaminodiphenylsulfone added. A cured casting of this heat-curable resin system was clear, indicating no phase separation.

EXAMPLE 11

To 1000 grams of a bisphenol F derived epoxy resin having an epoxy equivalent weight of 165 was added 1170 grams of a prereact which may be prepared from a bisphenol A based epoxy resin having a functionality of two and a low epoxy equivalent weight and bisphenol A. The prereact is commercially available from the DOW Chemical Co., as D.E.R. 661 epoxy resin having an epoxy equivalent weight of about 525. The curing agent, 745 grams of 4,4'-diaminodiphenylsulfone, was added at 160° F. along with 5 grams of borontrifluoride monoethylamine catalyst. No phase separation was noted.

EXAMPLE 12

To 170 grams of 2,7-dihydroxynaphthalene was added 1000 grams of an experimental epoxy resin mixture available from DOW as XP71756.01. After heating until complete dissolution, 1.5 grams ethyltriphenylphosphonium iodide was added and the mixture processed as before. To this prereact was added 1000 grams of a bisphenol F based epoxy resin having an epoxy equivalent weight of 165. 741 grams of 4,4'-diaminodiphenylsulfone curing agent was added at 160° F. Castings remained clear indicating no phase separation.

In Table I are presented results of Compression After Impact (CAI) and damage after impact studies of composites containing, as matrix resins, the resins of Examples 1–11. Prepregs were prepared from the resins on Hercules IM7 intermediate modulus carbon fiber. The areal fiber weight (AFW) of the unitape was 145 g/m$^2$ and the resin content 33±2% by weight. Panels were constructed, layed up, and cured in an autoclave using a 1.5° C./minute ramp to 180° C. and a hold at 180° C. for six hours. The panel layup was quasiisotropic $(+45,0,-45,90)_{4s}$, and the cured panels were subjected to 1500 in-lb/in impact and CAI testing as described in BSS7260 (Boeing Specification Support Standard) which is herein incorporated by reference. After impact, the damage area was determined by ultrasonic C-scan. Examples 5 and 9 were too brittle to be prepreggable.

TABLE I

| Example[1] | Damage Area [cm$^2$] | CAI [Ksi] | [MPa] |
| --- | --- | --- | --- |
| 1 | 6.6 | 43.9 | 302 |
| 2 | 8.8 | 40.8 | 281 |
| 3 | 7.1 | 43.5 | 300 |
| 4 | 9.6 | 41.3 | 285 |
| 6 (Comparative) | 10.7 | 38.8 | 267 |
| 7 | 8.7 | 44.4 | 306 |
| 8 (Comparative, c. f. Ex 7) | 10.3 | 39.5 | 272 |
| 11 | 7.9 | 44.8 | 309 |
| 12 | 8.4 | 45.3 | 312 |

[1]Examples 5 and 9 (both comparative) were so brittle as not to be prepreggable.

The embodiments of the invention in which an exclusive privilege or property is claimed are defined as follows:

1. A heat-curable resin system, comprising:
   (a) from 10 to about 80 weight percent of an epoxy resin component;
   (b) from 10 to about 50 weight percent of a prereact component; and
   (c) from 0.8 to about 1.6 equivalents, based upon the epoxy groups in components (a) and (b), of an aromatic diamine curing agent;

wherein said prereact component (b) is the essentially phenolic hydroxyl-free reaction product of an epoxy resin and a diphenol; wherein the molecular weight of component (b) is such that phase separation does not result upon cure of the heat-curable resin system; and wherein all percents of (a) and (b) are percents by weight relative to the total weight of components (a), (b), and (c).

2. The heat-curable resin system of claim 1 wherein said resin system, when used to impregnate intermediate modulus carbon fibers to form a prepreg which is laid up into a composite, cured, and tested according to Boeing Specification Support Standard BSS 7260, retains a CAI value in excess of 275 MPa after an impact of 6.68 kJ/m.

3. The composition of claim 2 wherein said CAI value is greater than 300 MPa.

4. The composition of claim 1 wherein said prereact component (b) is prepared through the reaction of an epoxy resin with a diphenol selected from the group consisting of the bisphenols; resorcinol; hydroquinone; the dihydroxynaphthalenes; the dihydroxybiphenyls; the phenolated monomeric and oligomeric dicyclopentadienes; and mixtures thereof.

5. The composition of claim 1 wherein said epoxy resin in prereact component (b) is a glycidyl derivative of a diphenol selected from the group consisting of bisphenol A, bisphenol F, bisphenol S, the dihydroxynaphthalenes, the phenolated monomeric and oligomeric dicyclopentadienes, and the phenol terminated polyarylene oligomers containing ether, carbonyl, or sulfone groups interspersed between the arylene groups and having 10 or fewer arylene groups in the polyarylene oligomer; and mixtures thereof.

6. The composition of claim 1 wherein the epoxy resin component (a) is a glycidyl derivative of a diphenol selected from the group consisting of bisphenol A; bisphenol F; bisphenol S; the dihydroxynaphthalenes; the phenolated monomeric and oligomeric dicyclopentadienes; and the phenol terminated polyarylene oligomers containing ether, carbonyl, or sulfone groups interspersed between the arylene groups and having 10 or fewer arylene groups in the polyarylene oligomer; and mixtures thereof.

7. The composition of claim 1 wherein said curing agent (c) is selected from the group consisting of the diaminodiphenylmethanes; 2,2-bis[diaminophenyl]propanes; diaminobenzenes; diaminodiphenyloxides; diaminophenylsulfides; diaminodiphenylsulfones; and the aminophenyl terminated polyarylene oligomers having interspersed ether, carbonyl, and sulfone groups, and containing less than about five arylene groups; and mixtures thereof.

8. The composition of claim 4 wherein said epoxy resin in component (b) is a glycidyl derivative of a diphenol selected from the group consisting of bisphenol A; bisphenol F; bisphenol S; the dihydroxynaphthalenes; the phenolated monomeric and oligomeric dicyclopentadienes; and the phenol terminated polyarylene oligomers containing ether, carbonyl, or sulfone groups interspersed between the arylene groups and having 10 or fewer arylene groups in the polyarylene oligomer; and mixtures thereof.

9. The composition of claim 6 wherein said epoxy resin in component (b) is a glycidyl derivative of a diphenol selected from the group consisting of bisphenol A; bisphenol F; bisphenol S; the dihydroxynaphthalenes; the phenolated monomeric and oligomeric dicyclopentadienes; and the phenol terminated polyarylene oligomers containing ether, carbonyl, or sulfone groups interspersed between the arylene groups and having 10 or fewer arylene groups in the polyarylene oligomer; and mixtures thereof.

10. The composition of claim 2 wherein said heat-curable resin system retains a substantial part of its initial tack after ten days storage at room temperature.

11. The composition of claim 3 wherein said heat-curable resin system retains a substantial part of its initial tack after ten days storage at room temperature.

12. The composition of claim 5 wherein said heat-curable resin system retains a substantial part of its initial tack after ten days storage at room temperature.

13. The composition of claim 6 wherein said heat-curable resin system retains a substantial part of its initial tack after ten days storage at room temperature.

14. The composition of claim 7 wherein said heat-curable resin system retains a substantial part of its initial tack after ten days storage at room temperature.

15. The composition of claim 8 wherein said heat-curable resin system retains a substantial part of its initial tack after ten days storage at room temperature.

16. The composition of claim 9 wherein said heat-curable resin system retains a substantial part of its initial tack after ten days storage at room temperature.

17. A heat curable prepreg comprising:
 (a) a matrix resin component, comprising:
  i. from 10 to about 80 weight percent of an epoxy resin component;
  ii. from 10 to about 50 weight percent of a prereact component; and
  iii. from 0.8 to about 1.6 equivalents, based upon the epoxy groups in components (a) and (b), of an aromatic diamine curing agent;
wherein said prereact component (ii) is essentially phenolic hydroxyl- group free wherein the molecular weight of component (ii) is such that phase separation does not result upon cure of the heat-curable resin system; and wherein all percents of (i) and (ii) are percents by weight relative to the total weight of components (i), (ii), and (iii); and
 (b) carbon fiber reinforcement;
such that a quasiisotropic panel when prepared and impacted in accordance with Boeing standard BSS 7260 results in a compression after impact of greater than 300 MPa after being subjected to an impact of about 6.68 kJ/m, and wherein said prepreg retains a substantial part of its initial tack after ten days storage at room temperature.

18. A heat curable prepreg comprising:
 (a) a matrix resin component, comprising:
  i. from 10 to about 80 weight percent of an epoxy resin component;
  ii. from 10 to about 50 weight percent of a prereact component; and
  iii. from 0.8 to about 1.6 equivalents, based upon the epoxy groups in components (a) and (ii), of an aromatic diamine curing agent;
wherein said prereact component (ii) is the essentially phenolic hydroxyl-free reaction product of an epoxy resin and a diphenol; wherein the molecular weight of component (ii) is such that phase separation does not result upon cure of the heat-curable resin system; and wherein all percents of (i) and (ii) are percents by weight relative to the total weight of components (i), (ii), and (iii); and
 (b) carbon fiber reinforcement;
such that a quasiisotropic panel when prepared and impacted in accordance with Boeing standard BSS 7260 results in a compression after impact of greater than 300 MPa after being subjected to an impact of about 6.68 kJ/m, and wherein said prepreg retains a substantial part of its initial tack after ten days storage at room temperature.

* * * * *